United States Patent [19]
Carroll et al.

[11] Patent Number: 5,975,139
[45] Date of Patent: Nov. 2, 1999

[54] SERVO CONTROL VALVE FOR A HYDRAULICALLY-ACTUATED DEVICE

[75] Inventors: Thomas S. Carroll; Chien Chang Lee, both of Peoria; David M. Milam, Metamora, all of Ill.

[73] Assignee: Caterpillar Inc., Peoria, Ill.

[21] Appl. No.: 09/004,899

[22] Filed: Jan. 9, 1998

[51] Int. Cl.$^6$ .................................................. F15B 13/043
[52] U.S. Cl. .................................. 137/625.64; 137/625.6; 137/625.68
[58] Field of Search ........................... 137/625.6, 625.64, 137/625.68

[56] References Cited

U.S. PATENT DOCUMENTS

| | | | |
|---|---|---|---|
| 2,913,005 | 11/1959 | Grant et al. | |
| 2,977,984 | 4/1961 | Barnes | 137/625.64 |
| 3,238,972 | 3/1966 | Bowman | 137/625.64 |
| 3,835,829 | 9/1974 | Links | 123/139 E |
| 4,108,419 | 8/1978 | Sturman et al. | 251/30 |
| 4,396,037 | 8/1983 | Wilcox | 137/625.65 |
| 4,485,846 | 12/1984 | Neff | 137/625.64 |
| 4,544,096 | 10/1985 | Burnett | 239/92 |
| 4,585,030 | 4/1986 | Fox | 137/625.64 |
| 4,590,968 | 5/1986 | Wolfges | 137/625.64 |
| 4,676,273 | 6/1987 | Stoltman | 137/625.64 X |
| 5,339,777 | 8/1994 | Cannon | 123/90.12 |
| 5,669,355 | 9/1997 | Gibson et al. | 123/446 |
| 5,687,693 | 11/1997 | Chen et al. | 251/30.05 X |
| 5,697,342 | 12/1997 | Anderson et al. | 123/446 |
| 5,720,318 | 2/1998 | Nagarajan et al. | 137/625.64 |

FOREIGN PATENT DOCUMENTS

| | | | |
|---|---|---|---|
| 2602844 | 8/1977 | Germany | 137/625.64 |
| 58-156784 | 9/1983 | Japan | 137/625.64 |
| 1 328 959 | 7/1971 | United Kingdom . | |
| 2213235 | 11/1988 | United Kingdom . | |
| 96/37700 | 11/1996 | WIPO . | |

*Primary Examiner*—Gerald A. Michalsky
*Attorney, Agent, or Firm*—Michael McNeil

[57] ABSTRACT

A servo control valve includes a valve body that defines a high pressure passage, a low pressure passage and a flow passage. A valve member has a first pressure surface in opposition to a control pressure surface. The valve member is positioned in the valve body and moveable between a first position in which the high pressure passage is open to the flow passage, and a second position in which the low pressure passage is open to the flow passage. A pilot member is positioned in the valve body and is moveable between an up position in which the control pressure surface is exposed to pressure in the high pressure passage, and a down position in which the control pressure surface is exposed to pressure in the low pressure passage. A spring is operably positioned to bias a valve member toward one of its first position and its second position.

19 Claims, 2 Drawing Sheets

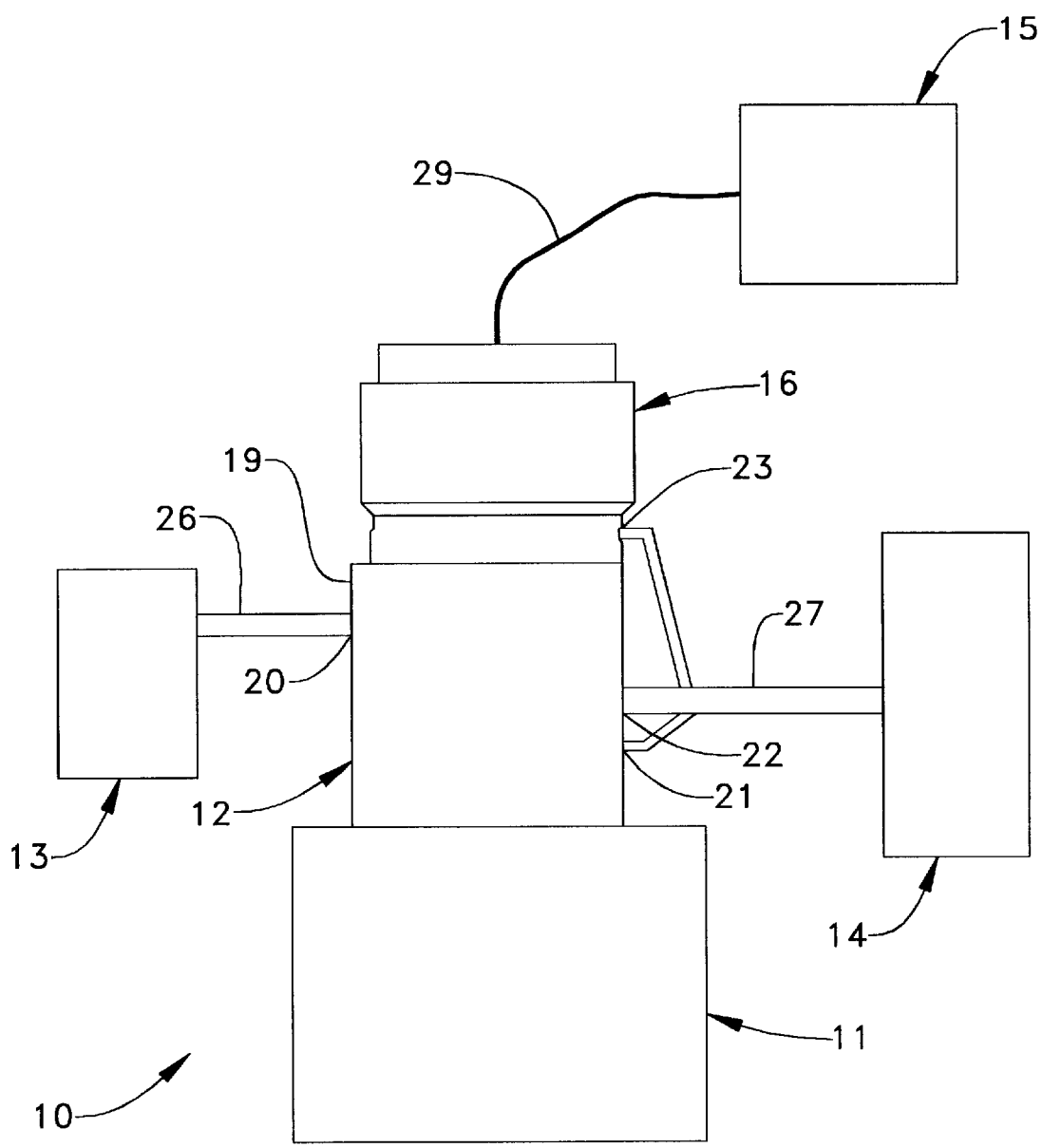
Fig_1_

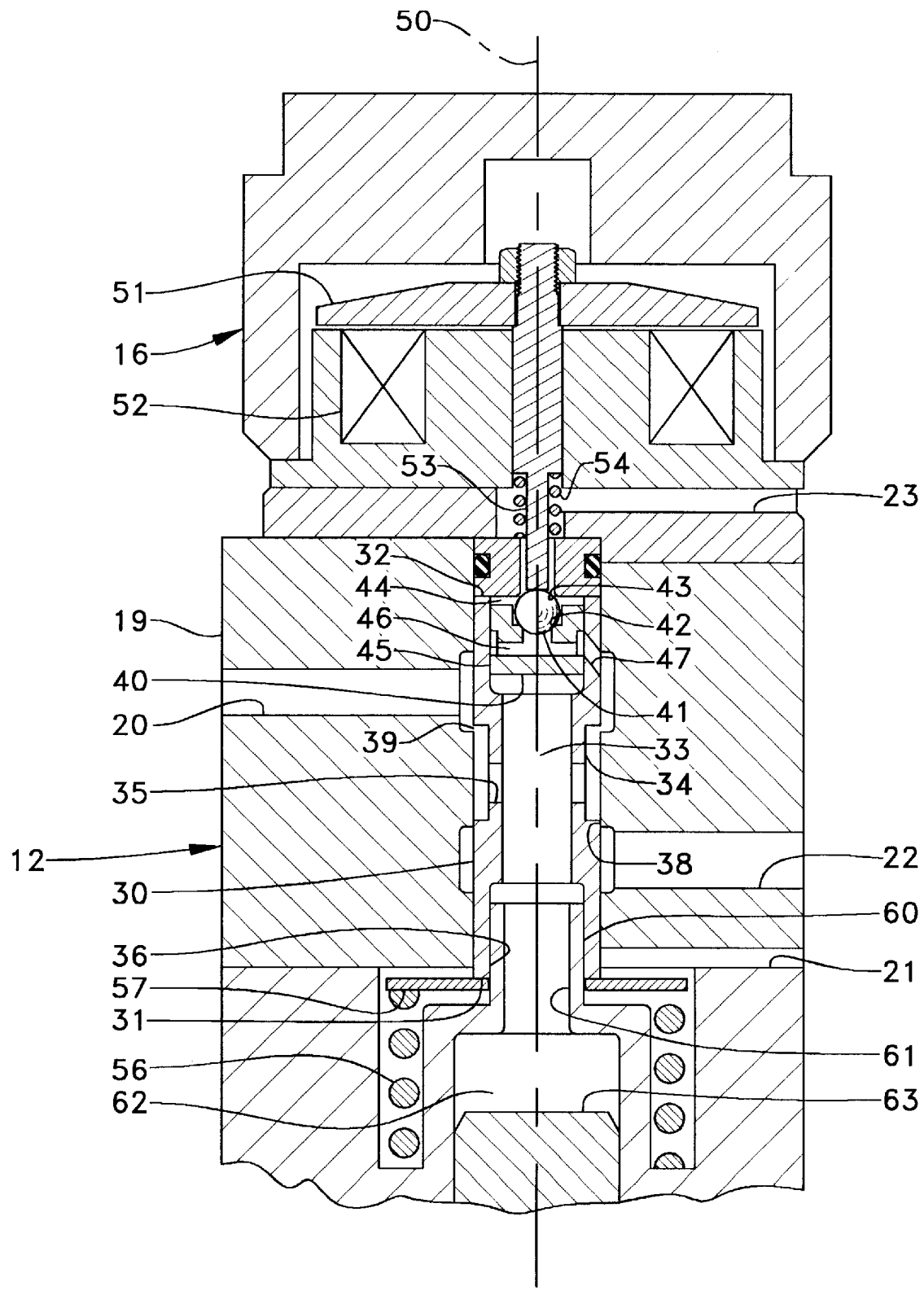
Fig_2_

SERVO CONTROL VALVE FOR A HYDRAULICALLY-ACTUATED DEVICE

DESCRIPTION

1. Technical Field

The present invention relates generally to electrically controlled fluid valves, and more particularly to an electronically controlled servo control valve for hydraulically-actuated devices.

2. Background Art

Hydraulically-actuated devices, such as fuel injectors and engine valves, are activated and de-activated via electronically controlled fluid valves. In a typical example, a poppet or spool valve member is attached to the armature of a solenoid. When the solenoid is energized, the valve member is moved to a position that opens the hydraulic device to a source of high pressure fluid. When the solenoid is de-energized, the valve member returns to a biased position, usually via a spring, to close the high pressure fluid and open the work chamber of the hydraulically-actuated device to a low pressure fluid drain. This permits the hydraulic device to reset itself for a subsequent operating cycle. The operation of the valve can be reversed such that a biasing spring opens the high pressure inlet and energization of the solenoid moves the valve member to close the high pressure fluid inlet.

In most but not all cases it is usually desirable that the control valve member move between positions as quickly as possible. In order to achieve desired valve speed, bigger solenoids and stronger return springs must typically be employed. Valve speed can also be improved by decreasing the mass of the valve member through complex machining and/or use of exotic metallic alloys. However, space constraints, manufacturing limits and cost concerns tend to place limitations on just how quickly a valve can be operated for a given hydraulically-actuated device in a particular application.

In an effort to develop a relatively fast control valve without relying upon relatively more powerful solenoids, Caterpillar, Inc. of Peoria, Ill. has developed a solenoid actuated miniservo spool valve, which is described in U.S. patent application No. 08/452,284, filed May 26, 1995 now U.S. Pat. No. 5,720,318. In that control valve, a relatively small but fast solenoid is used to move a pilot valve member between a low pressure seat and a high pressure seat. A spool valve member has a pair of equally sized opposing pressure surfaces, one of which is always exposed to the fluid pressure in the high pressure inlet. When the pilot valve member is moved by the solenoid against its high pressure seat, one end of the spool valve member is exposed to a low pressure vent, which creates a hydraulic imbalance on the spool valve member. This hydraulic imbalance causes the spool valve member to move to a position that opens the hydraulically-actuated device to the high pressure inlet. The flow enters the end of the spool and then passes from inside the spool to the outside via side passages. The speed at which the spool valve member moves is primarily a function of its mass properties, and the difference in pressure between the high pressure fluid inlet and the low pressure vent. The speed at which the valve opens is only dependent on the solenoid to the extent that the pilot member is moved by the solenoid before the spool moves.

When the solenoid is de-energized, the pilot member moves to a position against its low pressure seat through the action of hydraulic pressure acting on the pilot member. When this occurs, both opposing pressure surfaces of the spool valve member are exposed to the high pressure, which returns the spool valve member to a hydraulically balanced condition. A biasing spring, which is at least partially positioned within the spool valve member, then pushes the spool valve member toward a position that closes the high pressure inlet and simultaneously open a low pressure drain. This permits the hydraulically-actuated device to reset itself for a subsequent operating cycle. While this previous servo control valve has permitted faster operating valves without reliance upon more powerful solenoids, it includes a number of significant drawbacks and there remains room for improvement.

One of the problems associated with this previous servo control valve is that it necessarily includes a number of complicated and hard to machine passages that connect the spool valve member annulus to the working plunger, which often necessitates the need to utilize relatively costly electro-chemical machining. The previous design is also difficult to manufacture because of the difficulty in deburring the breakout between the flow passage and the spool sleeve's internal annulus. In some versions of this previous valve, undesirable high pressure plugs are used to alleviate the deburring problem. The previous design is also limited in that the speed at which it moves when in its hydraulically balanced condition is limited by the size of the spring that is utilized, which is at least partially positioned within the spool valve member itself. There also remains room for improvement since the number of flow restrictions and turns that the fluid must take in the previous valve necessarily results in a more than desirable loss in pressure between the high pressure inlet and the hydraulically-actuated device. This results in an undesirable delay in the build-up of pressure in the work chamber of the hydraulically-actuated device.

The present invention is directed to overcoming these and other problems, as well as generally improving upon control valves for hydraulically-actuated devices.

DISCLOSURE OF THE INVENTION

In one embodiment, a servo control valve includes a valve body that defines a high pressure passage, a low pressure passage and a flow passage. A valve member has a low pressure surface in opposition to a control pressure surface, and is positioned in the valve body. The valve member is moveable between a first position in which the high pressure passage is open to the flow passage and a second position in which the low pressure passage is open to the flow passage. A pilot member is positioned in the valve body and is moveable between an up position in which the control pressure surface of the valve member is exposed to pressure in the high pressure passage, and a down position in which the control pressure surface is exposed to pressure in the low pressure passage. A spring is operably positioned to bias the valve member toward its first position. A low pressure surface of the valve member is exposed to fluid pressure in the low pressure passage.

In another embodiment, a servo control valve includes a valve body that defines a high pressure passage, a low pressure passage, and a flow passage. A valve member that defines a hollow interior that opens on one end, and has a first pressure surface in opposition to a control pressure surface. The valve member is positioned in the valve body and moveable between a first position in which the high pressure passage is open to the flow passage through the hollow interior and out said one end, and a second position in which the low pressure passage is open to the flow passage via the hollow interior. A pilot member is positioned in the valve body and is moveable between an up position in which the control pressure surface is exposed to pressure in the high pressure passage, and a down position in which the control pressure surface is exposed to pressure in the low pressure passage. A spring is operably positioned to bias the valve member toward one of its first position and second position.

In still another embodiment, a servo control valve includes a valve body that defines a high pressure passage, a low pressure passage, and a flow passage. A valve member has a first pressure surface in opposition to a control pressure surface. The valve member is positioned in the valve body and moveable between a first position in which the high pressure passage is open to the flow passage, and a second position in which the low pressure passage is open to the flow passage. A pilot member is positioned in the valve body and is moveable between an up position in which the control pressure surface of the valve member is exposed to pressure in the high pressure passage, and a down position in which the control pressure surface is exposed to pressure in the low pressure passage. A spring is positioned outside the valve member and is operably positioned to bias the valve member toward one of the first position and the second position.

BRIEF DESCRIPTION OF THE DRAWINGS

FIG. 1 is a schematic illustration of a hydraulic system that includes a hydraulically-actuated device and a servo control valve according to the present invention.

FIG. 2 is a sectioned front view of a servo control valve according to the preferred embodiment of the present invention.

BEST MODE FOR CARRYING OUT THE INVENTION

Referring now to FIG. 1, hydraulic system 10 includes a hydraulically-actuated device 11, such as a fuel injector or an engine valve. A servo control valve 12 alternately opens hydraulically-actuated device 11 to a source of high pressure fluid 13 or a low pressure fluid reservoir 14. The state of servo control valve 12 is controlled by energizing and de-energizing an electrical actuating device 16, which is preferably a solenoid but could also be another suitable device such as a piezoelectric actuator. Electrical actuating device 16 is controlled in its operation via a conventional electronic control module 15 via communication line 29.

Servo control valve 12 includes a valve body 19 that defines a high pressure passage 20 that is connected to the source of high pressure fluid 13 via a high pressure supply line 26. In this embodiment, valve body 19 also defines a low pressure vent 21, a low pressure drain 22 and a second low pressure vent 23. These three low pressure openings communicate with low pressure fluid reservoir 14 via a low pressure passage 27.

Referring now to FIG. 2, the internal structure of servo control valve 12 is illustrated. As stated earlier, valve body 19 defines a high pressure passage 20, a first low pressure vent 21, a second low pressure vent 23 and a low pressure drain passage 22. In addition, valve body 19 includes a guide protrusion 60 that defines a flow passage 61 that opens on one end into a work chamber 62, which constitutes a portion of the hydraulically-actuated device 11 of FIG. 1. A spool valve member 30 is positioned in valve body 19 and is moveable between a first position, as shown, in which high pressure passage 20 is open to flow passage 61 past high pressure seat 39, around annulus 34 through side ports 35, along the hollow interior 33 and out one end of spool valve member 30. Spool valve member 30 is moveable downward to a second position in which high pressure seat 39 is closed but low pressure seat 38 is open such that flow passage 61 communicates with low pressure drain 22 via the hollow interior 33 of spool valve member 30.

Spool valve member 30 includes a low pressure surface 31 in opposition to control pressure surface 32. In this embodiment, these pressure surfaces are equal in area such that spool valve member is hydraulically balanced when the pressure acting on the opposing pressure surfaces are equal. Those skilled in the art will appreciate that different valve performance can be achieved by making the opposing pressure surfaces different in area. In this embodiment, low pressure surface 31 is always exposed to the low pressure vent 21. Low pressure vent 21 is isolated from the hollow interior 33 of spool valve member 30 by the relatively tight diametrical clearance existing between guide protrusion 60 and guide bore 36. Control pressure surface 32 is alternately exposed to the low pressure of second low pressure vent 23 or the high pressure passage 20 depending upon the up or down position of pilot member 41. In this embodiment, spool valve member 30 is biased toward its first position by a compression biasing spring 56 which is in operable contact with spool valve member 30 via washer 57. It is important to note that biasing spring 56 is located outside of spool valve member 30 such that its size and strength are not limited by available space within the spool valve member. For instance, this structure allows the spring 56 to have a diameter larger than spool valve member 30, as shown in FIG. 2.

Pilot member 41, which is preferably spherical, is positioned within a pilot valve insert 40. Pilot insert 40 defines a pilot biasing chamber 46 and control pressure chamber 44, which are separated from one another by a high pressure seat 42. Pilot biasing chamber 46 is always open to high pressure passage 20 via a slanted bore 47. Pilot biasing chamber 46 is isolated from the hollow interior 33 of spool valve member 30 by a seal 45, which is defined by the relatively tight diametrical clearance between pilot insert 40 and the interior of spool valve member 30. Control pressure chamber 44 is separated from low pressure vent 23 by a low pressure seat 43. Pilot member 41 moves up and down between high pressure seat 42 and low pressure seat 43 to alternately expose control pressure surface 32 of spool valve member 30 to high or low pressures.

In this embodiment, electrical actuating device 16 is a solenoid that is attached to valve body 19. The solenoid includes an armature 51 that is attached to a pin 53. The solenoid also includes a coil 52 that pulls armature 51 and pin 53 downward when the same is energized with current. A return spring 54 normally biases pin 53 upward to a position out of contact with pilot member 41. When solenoid 16 is de-energized, the continuous high pressure in pilot biasing chamber 46 pushes pilot member 41 upward to close low pressure seat 43. When solenoid 16 is energized, pin 53 is moved downward to push pilot member 41 downward to open low pressure seat 43 and close high pressure seat 42. In the preferred embodiment, pin 53, pilot member 41, spool valve member 30 and work piston 63 all move along a common centerline 50.

Industrial Applicability

The operation of servo control valve 12 will now be described. Before each operation is initiated, work piston 63 is normally retracted to an upward position via some biasing means, which is not shown. When solenoid 16 is de-energized, pilot member 41 is moved upward to close low pressure seat 43 from the continuous high pressure existing in pilot biasing chamber 46. In this position, spool valve member 30 is hydraulically imbalanced since low pressure surface 31 is exposed to the low pressure in low pressure vent 21, whereas control pressure surface 32 is exposed to the high pressure of high pressure passage 20. This hydraulic imbalance normally maintains spool valve member 30 in a downward position in which high pressure seat 39 is closed and low pressure seat 38 is open. This permits fluid to escape from work cavity 62 into low pressure drain 22 between actuation events.

Each work cycle of the hydraulically-actuated device is initiated by energizing solenoid 16. This causes pin 53 to move downward against the action of return spring 54 to push pilot member 41 downward to close high pressure seat 42. This changes spool valve member 30 from its previously hydraulically imbalanced state to a hydraulically balanced state since the opposing pressure surfaces 31 and 32 are now both exposed to the low pressure of respective vents 21 and 23. The action of biasing spring 56 then pushes spool valve member upward to close low pressure seat 38 and open high pressure seat 39. When this occurs, high pressure fluid flows in through high pressure passage 20 and into work chamber 62 via hollow interior 33 and out one end of spool valve member 30 into flow passage 61. This flow of high pressure fluid into work chamber 62 drives work piston 63 downward to actuate a device, such as to open an engine valve or pressurize fuel for a fuel injector.

The actuation cycle is ended by de-energizing the solenoid so that pilot member 41 is again moved upward by the high pressure existing in pilot biasing chamber 46 to close low pressure seat 43. This again creates a hydraulic imbalance in spool valve member 30 driving it downward to close high pressure seat 39 and open low pressure seat 38. The fluid in work chamber 62 is evacuated to low pressure drain 22 as work piston 63 retracts.

Since the solenoid only needs to move the relatively small and light pilot member 41, a substantially smaller solenoid is needed than would otherwise be required if the solenoid was required to move the complete spool valve member. In the preferred embodiment, the pilot member is not attached to move with the solenoid in order to accommodate for slight misalignments between the high and low pressure seats 42 and 43 with that of pin 53. Those skilled in the art will appreciate that the pilot member could be attached to, or part of, pin 53 in alternative embodiments of the present invention. In addition, while the pilot member is shown to be spherical, other shapes could be utilized.

The speed at which the high pressure passage opens to the work chamber is a function of the mass properties of the spool valve member as well as the strength of biasing spring 56. This embodiment has he advantage of the biasing spring being locatable outside of the spool valve member such that its size and strength are not limited by the size of any opening in the spool valve member. Thus, a substantially stronger spring can be utilized, and hence the speed at which the spool valve member moves can be increased.

In another aspect of the invention, the closure rate of the spool valve member in closing the high pressure passage 20 can be controlled both by choosing an appropriate biasing spring and/or by sizing the control pressure surface accordingly with respect to the expected fluid pressure in the high pressure passage. In some cases, such as in certain hydraulically-actuated fuel injectors, it may be desirable to make the speed at which the spool valve member moves to close the high pressure passage 20 relatively slow. This could be accomplished by simply decreasing the surface area of control pressure surface 32 relative to the spring strength of biasing spring 56. The speed at which the spool valve member moves to close the high pressure passage 20 can also be increased by simply increasing the size of control pressure surface 32. Thus, the present invention allows engineers to control the speed at which the valve moves in one direction somewhat independently of the speed at which it moves in the other direction. In addition, both of these speeds can be controlled somewhat independent of the size and strength of the solenoid used to move the pilot member.

The present invention has other subtle yet important advantages over previous control valves in that pressure losses are decreased since the flow of fluid through the valve passes through the interior and out one end of the spool valve member along the centerline of the valve, rather than being directed around corners, etc. through various passageways that are machined in the valve body, as in previous control valves. This permits pressure in the hydraulically-actuated device to build faster. This advantage is furthered by incorporating the flow passage 61 into the guide protrusion 60. By directing flow directly downward through the interior and out one end of the valve member, the machining complexities and difficulties in manufacturing the valve as a whole are substantially reduced over the previous control valve, which has a very similar appearance. This eliminates the high pressure plugs and/or difficult-to-debur passage intersections of previous valves. The downward flow path along the centerline also eliminates any need for difficult and expensive electro-chemical machining required in the hard to reach locations of previous valve bodies. The present valve achieves these advantages by channeling the high pressure flow through the interior and out one end of the valve member, rather than the opposite as in the previous servo control valve.

Those skilled in the art will appreciate that the above description is intended for illustrative purposes only and is not intended to limit the scope of the invention in any way. Those skilled in the art will no doubt appreciate that modifications to various aspects of the invention can be made without departing from the intended scope of the present invention. For instance, while not desired in the preferred embodiment, a poppet valve could be substituted for the illustrated spool valve and still retain several but not all of the advantages of the present invention. A poppet valve undesirably allows the high pressure inlet to be open directly to the low pressure drain when moving between positions. Also, the present invention could also be varied by always exposing one end of the valve member to high pressure rather than low pressure as in the preferred embodiment. Finally, the biasing spring of the present invention could also be positioned within the spool valve member and still retain several of the advantages of the present invention.

We claim:

1. A hydraulic servo control valve comprising:
   a valve body defining a high pressure passage, a low pressure >passage and a flow passage;
   a valve member having a low pressure surface in opposition to S a control pressure surface, and said valve member being positioned in said valve body and being movable between a first position in which said high pressure passage is open to said flow passage and a second position in which said low pressure passage is open to said flow passage;
   said high pressure passage being fluidly connected to a source of high pressure fluid;

said low pressure passage being fluidly connected to a low pressure fluid reservoir;

a pilot member positioned in said valve body and being movable between an up position in which said control pressure surface is exposed to pressure in said high pressure passage, and a down position in which said control pressure surface is exposed to pressure in said low pressure passages and said pilot member being stoppable only at said up position and said down position;

a spring operably positioned to bias said valve member toward said first position;

said low pressure surface being exposed to fluid pressure in said low pressure passage;

said valve body including a guide protrusion that is received in a guide bore defined by said valve member; and a portion of said flow passage being defined by said guide protrusion.

2. The hydraulic servo control valve of claim 1 wherein said valve member is a spool valve member.

3. The hydraulic servo control valve of claim 1 further comprising an electrical actuator having an energized state and a de-energized state, and being operable to move said pilot member when switched from said de-energized state to said energized state.

4. The hydraulic servo control valve of claim 1 wherein said valve member defines a hollow interior that opens through one end of said valve member, and said high pressure passage being fluidly connected to said flow passage via said hollow interior and said one end when said valve member is in said first position; and said hollow interior connecting said low pressure passage to said flow passage when said valve member is in said second position.

5. The hydraulic servo control valve of claim 1 wherein said spring is positioned outside of said valve member.

6. The hydraulic servo control valve of claim 5 wherein said valve member defines a hollow interior that opens through one end of said valve member, and said high pressure passage being fluidly connected to said flow passage via said hollow interior and said one end when said valve member is in said first position; and said hollow interior connecting said low pressure passage to said flow passage when said valve member is in said second position.

7. A hydraulic servo control valve comprising:

a valve body defining a high pressure passage, a low pressure passage and a flow passage;

a valve member defining a hollow interior that opens through one end of said valve member and having a first pressure surface in opposition to a control pressure surface, and said valve member being positioned in said valve body and being movable between a first position in which said high pressure passage is open to said flow passage through said hollow interior and out said one end, and a second position in which said low pressure passage is open to said flow passage;

said high pressure passage being fluidly connected to a source of high pressure fluid:

said low pressure passage being fluidly connected to a low pressure fluid reservoir:

a pilot member positioned in said valve body and being movable between an up position in which said control pressure surface is exposed to pressure in said high pressure passage, and a down position in which said control pressure surface is exposed to pressure in said low pressure passage, and said pilot member being stoppable only at said up position and said down position; and a spring operably positioned to bias said valve member toward one of said first position and said second position.

8. The hydraulic servo control valve of claim 7 wherein said valve member is a spool valve member.

9. The hydraulic servo control valve of claim 8 further comprising an electrical actuator having an energized state and a de-energized state, and being operable to move said pilot member when switched from said de-energized state to said energized state.

10. The hydraulic servo control valve of claim 8 wherein said valve body includes a guide protrusion that is received in a guide bore defined by said valve member; and a portion of said flow passage is defined by said guide protrusion.

11. The hydraulic servo control valve of claim 8 wherein said first pressure surface is exposed to fluid pressure in said low pressure passage.

12. The hydraulic servo control valve of claim 8 wherein said spring is positioned outside of said valve member.

13. The hydraulic servo control valve of claim 12 wherein said first pressure surface is exposed to fluid pressure in said low pressure passage.

14. A hydraulic servo control valve comprising:

a valve body defining a high pressure passage, a low pressure passage and a flow passage;

a valve member having a first pressure surface in opposition to a control pressure surface, and said valve member being positioned in said valve body and being movable between a first position in which said high pressure passage is open to said flow passage, and a second position in which said low pressure passage is open to said flow passage;

said high pressure passage being fluidly connected to a source of high pressure fluid;

said low pressure passage being fluidly connected to a low pressure fluid reservoir:

a pilot member positioned in said valve body and being movable between an up position in which said control pressure surface is exposed to pressure in said high pressure passage, and a down position in which said control pressure surface is exposed to pressure in said low pressure passage, and said pilot member being stoppable only at said up position and said down position; and a spring positioned outside said valve member and being operable to bias said valve member toward one of said first position and said second position, and said spring having a diameter larger than said valve member.

15. The hydraulic servo control valve of claim 14 wherein said valve member is a spool valve member.

16. The hydraulic servo control valve of claim 15 further comprising an electrical actuator having an energized state and a de-energized state, and being operable to move said pilot member when switched from said de-energized state to said energized state.

17. The hydraulic servo control valve of claim 15 wherein said first pressure surface is exposed to fluid pressure in said low pressure passage.

18. The hydraulic servo control valve of claim 17 wherein said valve member defines a hollow interior that opens through one end of said valve member, and said high pressure passage being fluidly connected to said flow passage via said hollow interior and said one end when said valve member is in said first position; and said hollow interior connecting said low pressure passage to said flow passage when said valve member is in said second position.

19. The hydraulic servo control valve of claim 18 wherein said valve body includes a guide protrusion that is received in a guide bore defined by said valve member; and a portion of said flow passage is defined by said guide protrusion.

* * * * *